United States Patent
Kris et al.

[11] Patent Number: 6,155,681
[45] Date of Patent: *Dec. 5, 2000

[54] PROGRESSIVE LENS

[75] Inventors: Dimitrios Jack Kris, Fulham Gardens; Simon John Edwards, St. Peters; Scott Warren Fisher, Aberfoyle Park; Saulius Raymond Varnas, Brighton, all of Australia

[73] Assignee: Sola International Holdings Ltd., Lonsdale, Australia

[*] Notice: This patent is subject to a terminal disclaimer.

[21] Appl. No.: 09/171,465

[22] PCT Filed: Apr. 17, 1997

[86] PCT No.: PCT/AU97/00240

§ 371 Date: Dec. 15, 1998

§ 102(e) Date: Dec. 15, 1998

[87] PCT Pub. No.: WO97/40415

PCT Pub. Date: Oct. 30, 1997

[30] Foreign Application Priority Data

Apr. 24, 1996 [AU] Australia ................... PN9440

[51] Int. Cl.[7] .................................................. G02C 7/06
[52] U.S. Cl. .................................................. 351/169
[58] Field of Search ................... 351/168, 169, 351/170, 171, 172, 177

[56] References Cited

U.S. PATENT DOCUMENTS 5,867,246  2/1999  Edwards et al. .................. 351/169

FOREIGN PATENT DOCUMENTS

| 36944/95 | 5/1996 | Australia . |
| 0 295 849 | 12/1988 | European Pat. Off. . |
| 0 318035 | 5/1989 | European Pat. Off. . |
| 0 384128 | 8/1990 | European Pat. Off. . |
| 0 627645 | 12/1994 | European Pat. Off. . |
| 2273369 | 6/1994 | United Kingdom . |

*Primary Examiner*—Scott J. Sugarman
*Attorney, Agent, or Firm*—Burns, Doane, Swecker & Mathis, L.L.P.

[57] ABSTRACT

A progressive ophthalmic lens element including a lens surface having upper viewing zone providing good optical quality at a predetermined low surface power over a large area of vision; said predetermined power being determined by the viewer's distance prescription ($R_x$) the horizontal fitting position normally being determined by the inter pupillary distance of the wearer, and the vertical fitting position normally being determined by the vertical frame midpoint; a lower viewing zone of higher surface power providing an enhanced range of vision for intermediate or lesser viewing distances; and a corridor of relatively low astigmatism extending therebetween; wherein the contours of mean surface power and/or surface astigmatism within the lower viewing zone, upper viewing zone and corridor are generally symmetric about a vertical lens meridian.

16 Claims, 3 Drawing Sheets

PROGRESSIVE LENS

BACKGROUND OF THE INVENTION

The present invention relates to a progressive ophthalmic lens and in particular an ophthalmic progressive lens exhibiting improved optical performance in the distance viewing region. It is a feature of the present invention to provide spectacles designed specifically for distance and intermediate vision and providing improved flexibility for the wearer, with an improved angular range of visual fields and greater tolerance to fitting variability.

Numerous progressive lenses are known in the prior art. A progressive lens in general exhibits a distance and intermediate viewing zone in which the intermediate zone joins the intermediate and distance zones in a cosmetically acceptable way, in the sense that no discontinuities in the lens should be visible to people observing the lens of the wearer. The intermediate zone should be optically acceptable in the sense that there should be a line or corridor called the eye path along which the line of vision moves while going between the distance and intermediate zones, and along which the optical power of the lens increases more or less uniformly. It is normal to select an eye path with a slant to accommodate the natural convergence of the eyes along the path.

However, in order to provide at least acceptable distance and intermediate viewing zones compromises may need to be made to any or all zones.

Moreover, in the prior art, in order to provide a range of distance and intermediate zone optical powers which permit optimum fitting of the lens to most patients, a large family of progressive lens blanks with different distance and intermediate zone powers have been necessary. It would be a significant advance in the art if an ophthalmic lens could be designed which requires a smaller family of individual lens types to satisfy the distance and intermediate viewing needs of a wide range of patients. This would be more nearly similar to the number of blanks in a single vision reading lens series.

In the prior art, the large power change between the distance and intermediate viewing zones results in large aberrations which greatly restrict the permissible fitting positions for the lens.

It would be a significant advance in the art if an ophthalmic lens could be designed with reduced sensitivity to horizontal fitting errors (such as errors in pupillary distance measurement of the wearer) and vertical fitting height errors ascribed to frame and face conformation measurement errors. This would make such lenses more similar in ease of fitting to single vision reading lenses.

SUMMARY OF THE INVENTION

It is accordingly an object of the present invention to overcome or at least alleviate one or more of the difficulties and deficiencies related to the prior art.

Accordingly, in a first aspect of the present invention there is provided a progressive ophthalmic lens including a lens surface having an upper viewing zone providing good optical quality at a predetermined low surface power over a large area of vision; said predetermined power being determined by the viewer's distance prescription ($R_x$) the horizontal fitting position normally being determined by the intermediate pupillary distance of the wearer, and the vertical fitting position normally being determined by the vertical frame midpoint;

a lower viewing zone of higher surface power providing an enhanced range of vision for intermediate or lesser viewing distances; and a corridor of relatively low astigmatism extending therebetween; wherein the contours of mean surface power and/or surface astigmatism within the upper viewing zone, lower viewing zone and corridor are generally symmetric about a vertical lens meridian.

In contrast to the prior art, it is a feature of the present invention to place emphasis on both distance and intermediate vision, with the aim of providing spectacles designed specifically for distance and intermediate vision. This results in a lens which is superior to conventional progressive lenses for distance and intermediate viewing and also superior to single vision distance lenses in providing an increased range of distances at which vision is sharp.

In order to do this the distance viewing zone has been specified to have a precise optical power and a large size, and the lower zone power is determined indirectly from the power of the distance through the addition of a power change to the optical power of the distance viewing zone. The magnitude of this power change may be selected so that the resulting lower zone power will be generally suitable for intermediate distance viewing. There may be no portion of the lens which is suitable for intermediate viewing.

In the progressive lens element according to the present invention the optical quality may be maximised in the upper viewing zone and the optical power of the lower viewing zone is determined indirectly by the application of a power increase from the optical power of the upper viewing zone. This may mean a limited area of vision which can be covered within the lower viewing zone through vertical and horizontal movement of the eyes alone.

A consequence of the lens providing preferably only for distance and intermediate vision is that the total power change between the upper and lower viewing zones will be substantially less than in a conventional progressive lens. The resulting reduced power gradient leads to a wider corridor which is more tolerant of horizontal fitting errors, and less sensitive to vertical fitting errors compared to a conventional progressive lens with the same length of power progression.

Applicants have further discovered that the eye paths used in designing prior art progressive lenses do not provide the desired visual fixation locus of the wearer for intermediate tasks in the lower portion of the lens.

Applicants have discovered that the visual fixation locus of the wearer, which may generally coincide with the vertical lens meridian of the lens element, may be inset generally horizontally in a nasal direction within the lower viewing zone, suitable for intermediate vision.

Accordingly, in a preferred aspect of the present invention there is provided a progressive ophthalmic lens element including a lens surface having upper viewing zone providing good optical quality at a predetermined low surface power over a large area of vision; said predetermined power being determined by the viewer's distance prescription ($R_x$) the horizontal fitting position normally being determined by the inter pupillary distance of the wearer, and the vertical fitting position normally being determined by the vertical frame midpoint;

a lower viewing zone of higher surface power providing an enhanced range of vision for intermediate or lesser viewing distances; and a corridor of relatively low astigmatism extending therebetween;

the lens element having a progressive design depending at least in part upon the visual fixation locus; the visual fixation locus being inset generally nasally within the lower viewing zone, the degree of horizontal inset increasing with increasing addition power.

Preferably the contours of mean surface power and/or surface astigmatism within the lower viewing zone, upper viewing zone and corridor are generally symmetric about a vertical lens meridian.

The variation in lens magnification results in a required variation or adjustment of inset on the lens surface so as to correctly place points on the visual fixation locus, such as the lower zone measurement point, so that the appropriate convergence can be achieved for the required working distance and visual task. Lens magnification effects may in turn be influenced by surfacing recommendations including lens thickness and the pantoscopic tilt of the lens.

The length of the horizontal inset is determined by consideration of the lens magnification and the visual convergence requirements of the wearer in the lower viewing zone. Determination of the visual convergence requires consideration of the minimum working distance for intermediate vision.

The horizontal inset of the lower viewing zone, when present, may vary up to approximately 2.00 mm, preferably up to approximately 1.50 mm, depending upon the prescription requirements of the particular wearer. A typical value is approximately 1.25 mm for a +2.00 D distance prescription. In general, the extent of lateral inset will increase with increasing addition power of the wearer.

By the term "visual fixation locus" we mean the set of points which are the intersection of the lens surface and the patient's line of sight as he or she fixates on objects in the median plane. The term does not signify a required, continuous eye movement path. Rather, the visual fixation locus indicates the set of points corresponding to variously positioned objects in the median plane. As a result, points at different locations on the visual fixation locus are provided having a power sufficient for comfortable use at the appropriate object distances.

In preferred embodiments of the present invention, the visual fixation locus lies along a line of essentially zero surface astigmatism in the intermediate zone. In the distance viewing zone, the line of essentially zero surface stigmatism broadens into areas of essentially zero surface astigmatism.

By the term "corridor" we mean an area below the distance zone of varying power bounded by nasal and temporal contours of tolerable aberration for foveal vision.

In a preferred embodiment the visual fixation locus lies on the horizontal midpoints between the nasal and temporal contours of tolerable aberration for foveal vision.

The corridor has a "corridor length" (L), which corresponds to the length of the segment of the visual fixation locus which extends from the vertical height at which the power progression begins to the vertical height of the intermediate zone measurement point. For example, in a typical lens element according to the present invention, the power progression begins at the fitting cross (FC) height.

As used herein the term "lens element" refers to all forms of refractive optical bodies employed in the ophthalmic arts, including, but not limited to, semi-finished lens blanks requiring further finishing to a particular patient's prescription. Also included are formers used in the manufacture of progressive glass lenses, and moulds for the casting of progressive lenses in polymeric material such as the material sold under the trade designation CR39.

As used herein the term "astigmatism" refers to surface astigmatism, which is a measure of the degree to which the curvature of the lens varies among intersecting planes which are normal to the surface of the lens at a point on the surface.

As used herein, the term "lens meridian" refers to an imaginary line of symmetry drawn through the power progression centre of a lens as fitted to the wearer.

As used herein, the term "zone width" refers to the horizontal distance between similar contours of surface astigmatism, surface power, optical power, or index of blur or other appropriate optical properties, defining a threshold of optical quality, for example the 0.50 D surface astigmatism contour.

Preferably the upper viewing zone of the progressive ophthalmic lens according to the present invention defines a relatively large distance viewing zone.

The predetermined optical power of the upper viewing zone may for example range from approximately −10.0 D to +10.0 D.

In an especially preferred arrangement, the upper viewing zone may be sufficient to allow full aperture distance vision consistent with a corresponding single vision lens, at a height of approximately 10 mm above the geometric centre of the lens element.

The progressive ophthalmic lens may be designed to have a uniform growth of power from the centre of one viewing zone to the other along a corridor of relatively low astigmatism.

The corridor or eye path between the lower viewing zone and the upper viewing zone in this embodiment may extend generally along the vertical lens meridian. This may be contrasted with a traditional progressive lens wherein the eye path is slanted. An advantage of this, it will be understood, is that there is no necessity to produce separate left and right lenses. This also permits simplified lens fitting and processing procedures.

The corridor or eye path may be relatively wide, and preferably relatively short, providing a short transition from one viewing zone to the other. The progression length may vary from approximately 5 mm to 20 mm, preferably approximately 10 mm.

The term "progression length" as used herein refers to the length of corridor over which optical power grows from 5% to 95% of the nominal addition power.

Progression power magnitude along the corridor may range from approximately 0.50 D to 2.50 D.

In a further preferred aspect the mean surface power and/or surface astigmatism contours may separate generally uniformly above and below the region of the lens corridor. Such generally uniform separation of contours creates a steady expansion of the width of the visual fields, but preferably with a minimum tendency to close at upper or lower extremes of the lens. This may be contrasted with the two viewing zones which would result if the lens was constructed to grow symmetrically from design centres corresponding substantially with the centres of these viewing zones.

In a preferred embodiment the lens surface may be described by equations of the types disclosed in U.S. Pat. Nos. 4,676,610 and 4,838,675 to applicants, the entire disclosures of which are incorporated herein by reference.

The progressive ophthalmic lens element may be of the glare reducing type, e.g as described in international patent application PCT/AU97/00180 to applicants the entire disclosure of which is incorporated herein by reference.

The progressive ophthalmic lens element may be a sunglass lens, e.g of the type described in international patent application PCT/AU97/00188 "Improved Single Vision Lens", to applicants, the entire disclosure of which is incorporated herein by reference.

The ophthalmic lens may be formulated from any suitable material. A polymeric material may be used. The polymeric material may be of any suitable type. The polymeric material my include a thermoplastic or thermoset material. A material of the diallyl glycol carbonate type may be used.

The polymeric article may be formed from cross-linkable polymeric casting compositions, for example as described in applicants U.S. Pat. No. 4,912,155, U.S. patent application No. 07/781,392, Australian Patent Applications 50581/93 and 50582/93, and European Patent Specification 453159A2, the entire disclosures of which are incorporated herein by reference.

Such cross-linkable polymeric casting compositions may include a diacrylate or dimethacrylate monomer (such as polyoxyalkylene glycol diacrylate or dimethacrylate or a bisphenol fluorene diacrylate or dimethacrylate) and a polymerisable comonomer, e.g. methacrylates, acrylates, vinyls, vinyl ethers, allyls, aromatic olefins, ethers, polythiols and the like.

For example, in Australian Patent Application 81216/87, the entire disclosure of which is incorporated herein by reference, applicant describes a cross-linkable coating composition including at least polyoxyalkylene glycol diacrylate or dimethacrylate and at least one poly functional unsaturated cross-linking agent.

Further, in Australian Patent Application 75160/91, the entire disclosure of which is incorporated herein by reference, applicant describes a polyoxyalkylene glycol diacrylate or dimethacrylate; a monomer including a recurring unit derived from at least one radical-polymerisable bisphenol monomer capable of forming a homopolymer having a high refractive index of more than 1.55; and a urethane monomer having 2 or 6 terminal groups selected from a group comprising acrylic and methacrylic groups.

Such polymeric formulations are UV cured or cured by a combination of UV and thermal treatment. The range of optical lenses sold under the trade designations "Spectralite" by Applicants have been found to be suitable.

The polymeric material may include a dye, preferably a photochromic dye, which may, for example, be added to the monomer formulation used to produce the polymeric material. The variation in depth of colour may be minimised by incorporating a pigment or dye into one or more layers of the optical article.

The ophthalmic lens element according to the present invention may further include standard additional coatings to the front or back surface including electrochromic coatings.

The front lens surface may include an anti-reflective (AR) coating, for example of the type described in U.S. Pat. No. 5,704,692 to applicants, the entire disclosure of which is incorporated herein by reference.

The front lens surface may include an abrasion resistant coating. e.g. of the type described in U.S. Pat. No. 4,954,591 to applicants, the entire disclosure of which is incorporated herein by reference.

In a particularly preferred form, the laminate ophthalmic article may include an inner layer providing desired optical properties of the type described in International Patent Application PCT/AU96/00805 to applicants, the entire disclosure of which is incorporated herein by reference.

The front and back surfaces may further include one or more additions conventionally used in casting compositions such as inhibitors, dyes including thermochromic and photochromic dyes, e.g. as described above, polarising agents, UV stabilisers and materials capable of modifying refractive index.

The ophthalmic lens element according to the present invention may be designed utilising a method similar to that described in international patent application PCT/EP97/00105, to applicants, the entire disclosure of which is incorporated herein by reference.

Accordingly, in a further aspect of the present invention, thus is provided a method of designing a progressive ophthalmic lens element, wherein the lens element is formed by
(a) providing a representation of a progressive lens surface in the form of a base surface function having an upper viewing zone providing good optical quality at a predetermined low surface power over a large area of vision; said predetermined power being determined by the viewer's distance prescription ($R_x$) the horizontal fitting position normally being determined by the inter pupillary distance of the wearer, and the vertical fitting position normally being determined by the vertical frame midpoint;
a lower viewing zone of higher surface power providing an enhanced range of vision for intermediate or lesser viewing distances; and
a corridor of relatively low astigmatism extending therebetween; wherein the contours of mean surface power and/or surface astigmatism within the lower viewing zone, upper viewing zone and corridor are generally symmetric about a vertical lens meridian.
(b) modifying the base surface function of the lens surface on the basis of a merit function selected to maximise the width of vision and minimise surface astigmatism; and
(c) forming a lens having a lens surface shaped according to said modified surface function.
Step (b) may be performed by finite element methods. A merit function may be employed to achieve the desired location of the selected isoastigmatism curves. One or both of the nasal and temporal isoastigmatism curves of the selected dioptric value may be locally adjusted as required to give the corridor mid-line the desired slope at locations consistent with the power progression required. Finite elements analysis may be utilised to solve the corresponding ophthalmic problem.

In a preferred aspect, the lens surface includes a relatively short corridor wherein the surface power increases approximately linearly from the upper viewing zone to the lower viewing zone.

In a further preferred embodiment, where the visual fixation locus is to be inset a horizontal distance as described above the method may further include
(d) rotating all or part of the representation of the lens surface to achieve horizontal inset and the variation of inset required by the progressive power increase in the corridor.

The rotation step may be applied before or after the modification step (b).

The present invention will now be more fully described with reference to the accompanying drawings and examples. It should be understood, however, that the description following is illustrative only and should not be taken in any way as a restriction on the generality of the foregoing description.

Methods for producing progressive lenses from a final surface function will be known to those skilled in the art. For example, the manufacture of such a progressive lens may be carried out by using the final surface function referred to above to provide height values for a multiplicity of points, e.g. at 1 millimeter centres, and then, by means of a numerically controlled milling machine, producing a porous ceramic former with a surface configuration corresponding to the aforementioned height values.

The porous ceramic former, thus prepared, can then be used in a conventional manner to form a progressive surface of a glass lens or lens blank by sag forming techniques. The porous former can also be used to form a mould part, which can then be used to form the progressive surface in a cast lens in a conventional lens casting process. Techniques of using such formers are described in, for example, U.S. Pat. No. 4,062,629 to Winthrop (see columns 14 and 19).

It will be apparent that, because of the inherent limitations of the milling procedure and the need to then carry out one or more steps before achieving the desired progressive lens surface on a lens or lens blank, the progressive lens surface obtained cannot match in a mathematically exact manner the expressions used to generate the instructions for the milling machine. Another inaccuracy inherently induced in the process is caused by the fact that the milling machines necessarily employ a finite size of grid. The correspondence between the final surface function and the manufactured surfaces will vary slightly as one moves from former to lens or from former to mould to lens. However, it has been found in practice that variations so introduced are limited and do not result in a lens whose performance characteristics are unpredictable. The lens form is, of course, the tangible article whose form will most closely correspond to the final surface function.

The present invention will now be more fully described with reference to the accompanying examples and drawings. It should be understood, however, that the description following is illustrative only and should not be taken in any way as a restriction on the generality of the invention described above.

DESCRIPTION OF THE PREFERRED EMBODIMENTS

EXAMPLE 1

The following description illustrates the operation of the method of the present invention by specific numerical examples.

Figure 1A:
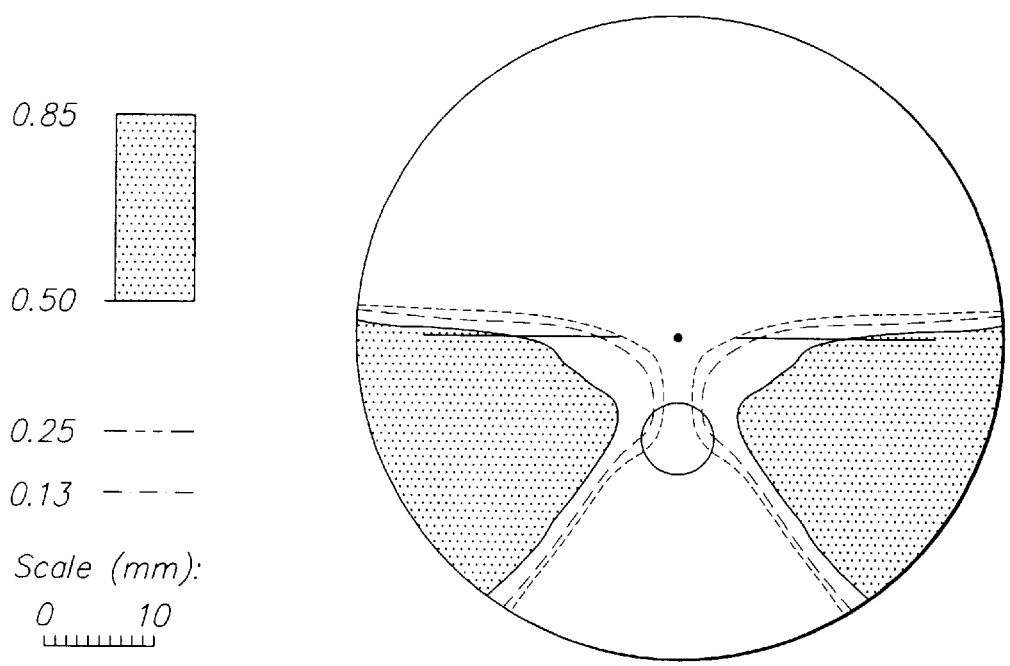
FIGS. 1(a), (b) & (c) illustrates the surface astigmatism contours, mean surface power contours and eye path profile, respectively of a progressive lens element according to the present invention having a 5.00 D base are and 0.50 D addition power.
Figure 1B:
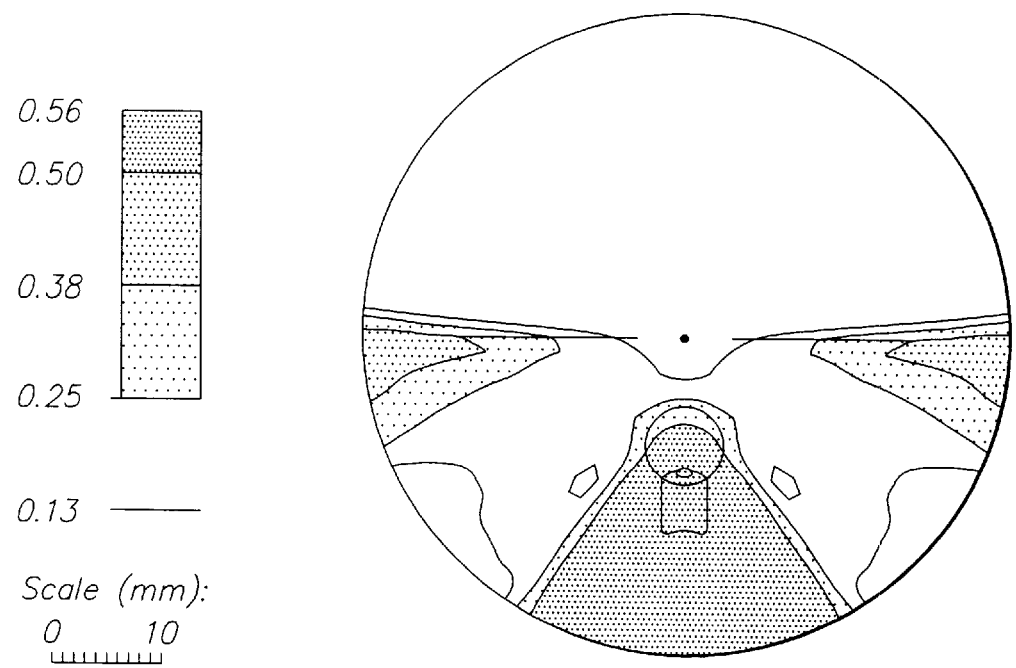
Figure 1C:
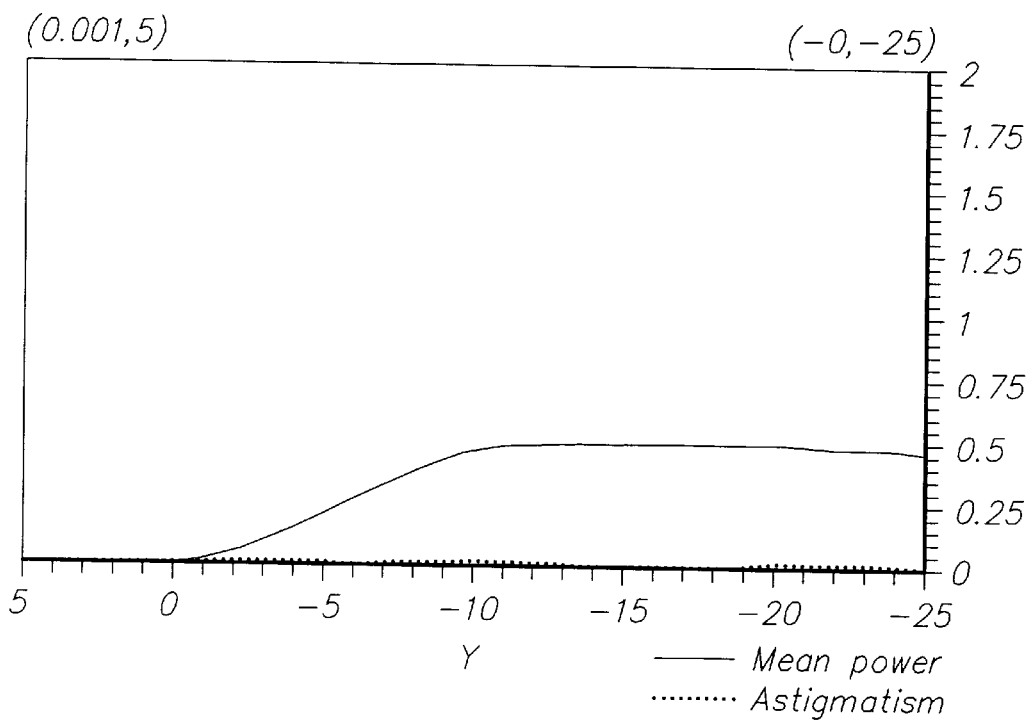

A progressive lens element having a 5.00 D base area 0.50 D addition power, as illustrated in FIGS. 1(a), (b) & (c) according to the present invention was constructed as follows:—

The required characteristics of the lens element are as follows:—

| Base | 5.00 D @ 1.530 |
|---|---|
| Add | 0.50 D |
| Material Index | 1.50 |
| Eye Centre of Rotation Distance L | 27 mm |
| Distance Rx | 0.00 D |
| Intermediate Refraction Distance Zref | 2.00 m |
| Corridor length | 10 mm |

EXAMPLE 2

Example 2 was illustrates a progressive less element having a 5.00 D base curve and an 1.0 D addition power.

Figure 2C:
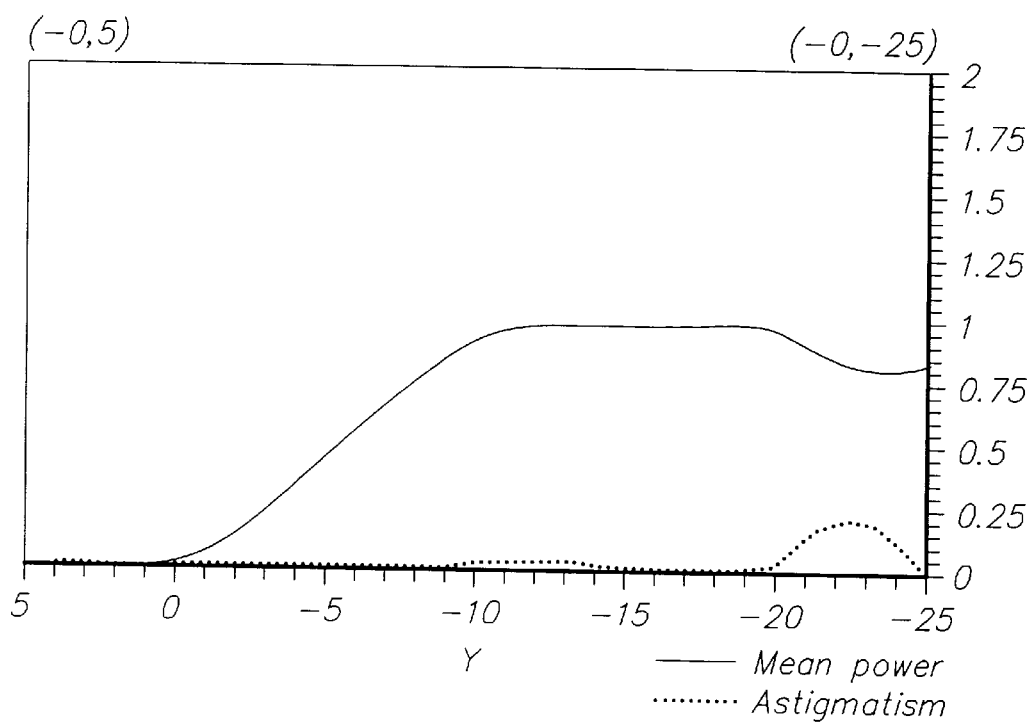
FIGS. 2(a), (b) & (c) illustrates the surface astigmatism contours, mean surface power contours and eyepath profile, respectively of a progressive lens element according to the present invention having a 5.00 D base are and 1.00 D addition power.
Figure 2A:
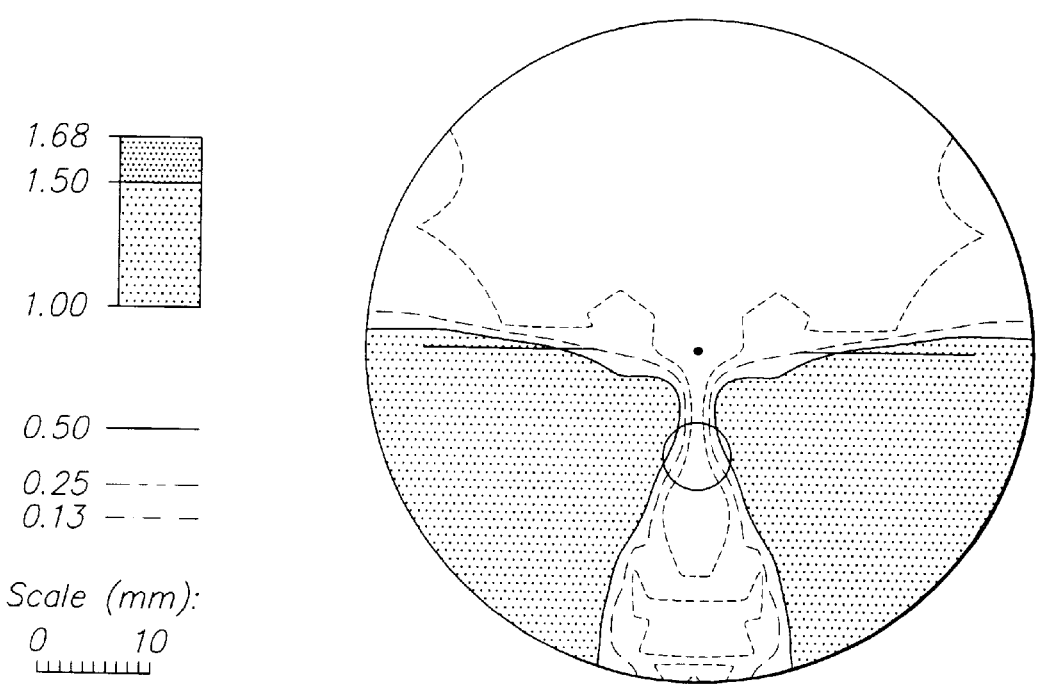
Figure 2B:
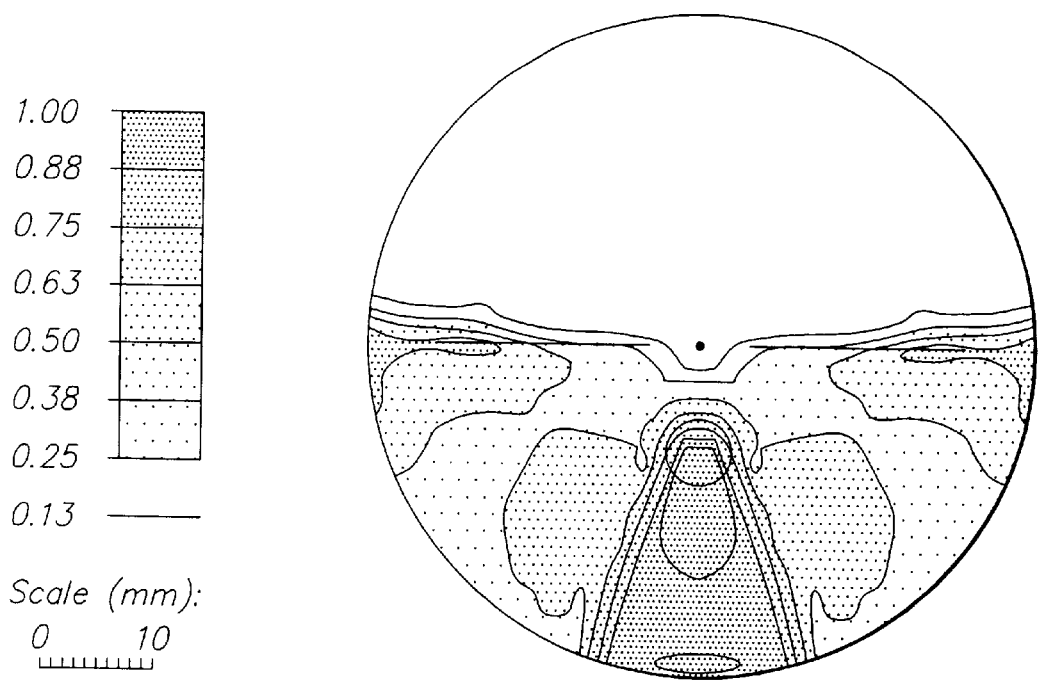

A progressive lens element having a 5.00 d base area 1.00 d addition power, as illustrated in FIGS. 2(a), (b) & (c) according to the present invention was constructed as follows:—

The required characteristics of the lens element are as follows:—

| Base | 5.00 D @ 1.530 |
|---|---|
| Add | 1.00 D |
| Material Index | 1.50 D |
| Eye Centre of Rotation Distance L | 27 mm |
| Distance Rx | 0.00 D |
| Intermediate Refraction Distance Zref | 1.00 m |
| Corridor length | 10 mm |

Finally, it is to be understood that various other modifications and/or alterations may be made without departing from the spirit of the present invention as outlined herein.

What is claimed is:

1. A progressive ophthalmic lens element including a lens surface having an upper viewing zone providing good optical quality at a predetermined low surface power over a large area of vision; said predetermined power being determined by the viewer's distance prescription ($R_x$) the horizontal fitting position normally being determined by the inter pupillary distance of the wearer, and the vertical fitting position normally being determined by the vertical frame midpoint;

a lower viewing zone of higher surface power providing an enhanced range of vision for intermediate distances; and a corridor of relatively low astigmatism extending therebetween; wherein the contours of mean surface power and/or surface astigmatism within the lower viewing zone, upper viewing zone and corridor are generally symmetric about a vertical lens meridian.

2. A progressive lens element according to claim 1 wherein the optical quality is maximized in the upper viewing zone and the optical power of the lower viewing zone is determined indirectly by the application of a power increase from the optical power of the upper viewing zone.

3. A progressive lens element according to claim 2 wherein the upper viewing zone is adapted for distance vision and the lower viewing zone is adapted for intermediate vision.

4. A progressive lens element according to claim 1, wherein the lens element has a progressive design depending at least in part on the visual fixation locus; the visual fixation locus being inset generally nasally within the lower viewing zone, the degree of horizontal inset increasing with increasing addition power.

5. A progressive lens element according to claim 3 wherein the upper viewing zone width provides full aperture distance vision at a height of approximately 10 mm above the geometric centre of the lens element.

6. A progressive lens element according to claim 1 wherein the total power change between the upper and lower viewing zones is substantially less than would be prescribed for a conventional reading addition.

7. A progressive lens element according to claim 6 wherein the resulting reduced power gradient leads to a wider corridor.

8. A progressive lens element according to claim 7, wherein the surface power increases approximately linearly from the datum line to the intermediate reference point in the lower viewing zone.

9. A progressive lens element according to claim 7 wherein the corridor has a progression length of approximately 5 mm to 20 mm and a progression power of magnitude from approximately 0.50 D to 2.50 D.

10. A progressive lens element according to claim 1 wherein mean surface power is nearly constant above the horizontal line passing through the center of the lens and all variation in mean power and surface astigmatism occurs below this line.

11. A progressive lens element according to claim 1 wherein the contours of mean surface power and/or surface astigmatism separate generally uniformly on either side of the region of the lens corridor, such that there is a steady expansion of the width of the visual fields.

12. A progressive ophthalmic lens element including a lens surface having an upper viewing zone providing good optical quality at a predetermined low surface power over a large area of vision; said predetermined power being determined by the viewer's distance prescription ($R_x$) the horizontal fitting position normally being determined by the inter pupillary distance of the wearer, and the vertical fitting position normally being determined by the vertical frame midpoint;

a lower viewing zone of higher surface power providing an enhanced range of vision for intermediate or lesser viewing distances; and a corridor of relatively low astigmatism extending therebetween;

the lens element having a progressive design depending at least in part on the visual fixation locus; the visual fixation locus being inset generally nasally within the lower viewing zone, the degree of horizontal inset increasing with increasing addition power.

13. A progressive lens element according to claim 12 wherein the contours of mean surface power and/or surface astigmatism within the lower viewing zone, upper viewing zone and corridor are generally symmetric about a vertical lens meridian.

14. A progressive lens element according to claim 12, wherein the horizontal inset varies up to approximately 2.0 mm depending on the addition power of the wearer.

15. A method of designing a progressive ophthalmic lens element, wherein the lens element is formed by (a) providing a representation of a progressive lens surface in the form of a base surface function having an upper viewing zone providing good optical quality at a predetermined low surface power over a large area of vision; said predetermined power being determined by the viewer's distance prescription the horizontal fitting position normally being determined by the inter pupillary distance of the wearer, and the vertical fitting position normally being determined by the vertical frame midpoint;

a lower viewing zone of higher surface power providing an enhanced range of vision for intermediate or lesser viewing distances; and a corridor of relatively low astigmatism extending therebetween; wherein the contours of mean surface power and/or surface astigmatism within the lower viewing zone, upper viewing zone and corridor are generally symmetric about a vertical lens meridian.

(b) modifying the base surface function of the lens surface on the basis of a merit function selected to maximize the width of vision and minimize surface astigmatism; and (c) forming a lens having a lens surface shaped according to said modified surface function.

16. A method according to claim 15, further including (d) rotating all or part of the representation of the lens surface, before or after step (b), to achieve horizontal inset in the lower viewing zone and the variation of inset required by the progressive power increase in the corridor.

* * * * *